US009482361B2

(12) United States Patent
Petrangeli et al.

(10) Patent No.: US 9,482,361 B2
(45) Date of Patent: *Nov. 1, 2016

(54) MAGNETICALLY ACTUATED VALVE

(75) Inventors: Gabriele Petrangeli, Cittaducale (IT); Stefano Livoti, Cittaducale (IT)

(73) Assignee: SEKO S.P.A. (IT)

( * ) Notice: Subject to any disclaimer, the term of this patent is extended or adjusted under 35 U.S.C. 154(b) by 255 days.

This patent is subject to a terminal disclaimer.

(21) Appl. No.: 14/233,545

(22) PCT Filed: Jul. 19, 2012

(86) PCT No.: PCT/IB2012/053702
§ 371 (c)(1),
(2), (4) Date: Jan. 17, 2014

(87) PCT Pub. No.: WO2013/011487
PCT Pub. Date: Jan. 24, 2013

(65) Prior Publication Data
US 2014/0131601 A1 May 15, 2014

(30) Foreign Application Priority Data

Jul. 20, 2011 (IT) .............................. RM2011A0387

(51) Int. Cl.
*F16K 31/08* (2006.01)
*B01F 5/04* (2006.01)
(Continued)

(52) U.S. Cl.
CPC ............. *F16K 31/08* (2013.01); *B01F 3/0865* (2013.01); *B01F 5/0428* (2013.01); *F16K 31/086* (2013.01); *F16K 31/088* (2013.01); *F16K 31/3835* (2013.01); *B01F 2003/0896* (2013.01)

(58) Field of Classification Search
CPC .... F16K 31/08; F16K 31/086; F16K 31/088; F16L 37/144; F16L 35/00; F16L 2201/20; B01F 3/08; B01F 3/0861; B01F 3/0865

USPC .......................................................... 251/65
See application file for complete search history.

(56) References Cited

U.S. PATENT DOCUMENTS 3,212,751 A * 10/1965 Hassa ............................. 251/65
3,560,027 A * 2/1971 Graham ..................... 285/130.1
(Continued)

FOREIGN PATENT DOCUMENTS

DE           3927611 A1    9/1990
GB           2103391       2/1983
WO   WO 2007/017496 A2    2/2007

OTHER PUBLICATIONS

International Search Report mailed Oct. 19, 2012, for PCT/IB2012/053702.

*Primary Examiner* — Kevin Murphy
(74) *Attorney, Agent, or Firm* — Hershkovitz & Associates, PLLC; Abe Hershkovitz

(57) ABSTRACT

This invention relates to a magnetically actuated valve (60), in particular for a mixing apparatus, comprising mechanical means (50, 51, 53, 62) for opening and closing the valve (60), at least one ferromagnetic metal pin (52) mobile between a rest position and an operating position, and at least one activation magnet (61) mobile between a first position and a second position, said mechanical means (50, 51, 53, 62) being capable to interact with said at least one ferromagnetic metal pin (52) for opening and closing the valve (60), said at least one activation magnet (61) being capable to magnetically interact with said at least one ferromagnetic metal pin (52), the valve (60) being characterized in that it comprises sliding mechanical means (63, 64, 65, 66, 67, 68) comprising a slide (63) integrally coupled to said at least one activation magnet (61) and mobile between an initial position and a final position. This invention further relates to an apparatus for mixing a liquid comprising such magnetically actuated valve (60).

16 Claims, 8 Drawing Sheets

(a)

(b)

Figure 3:
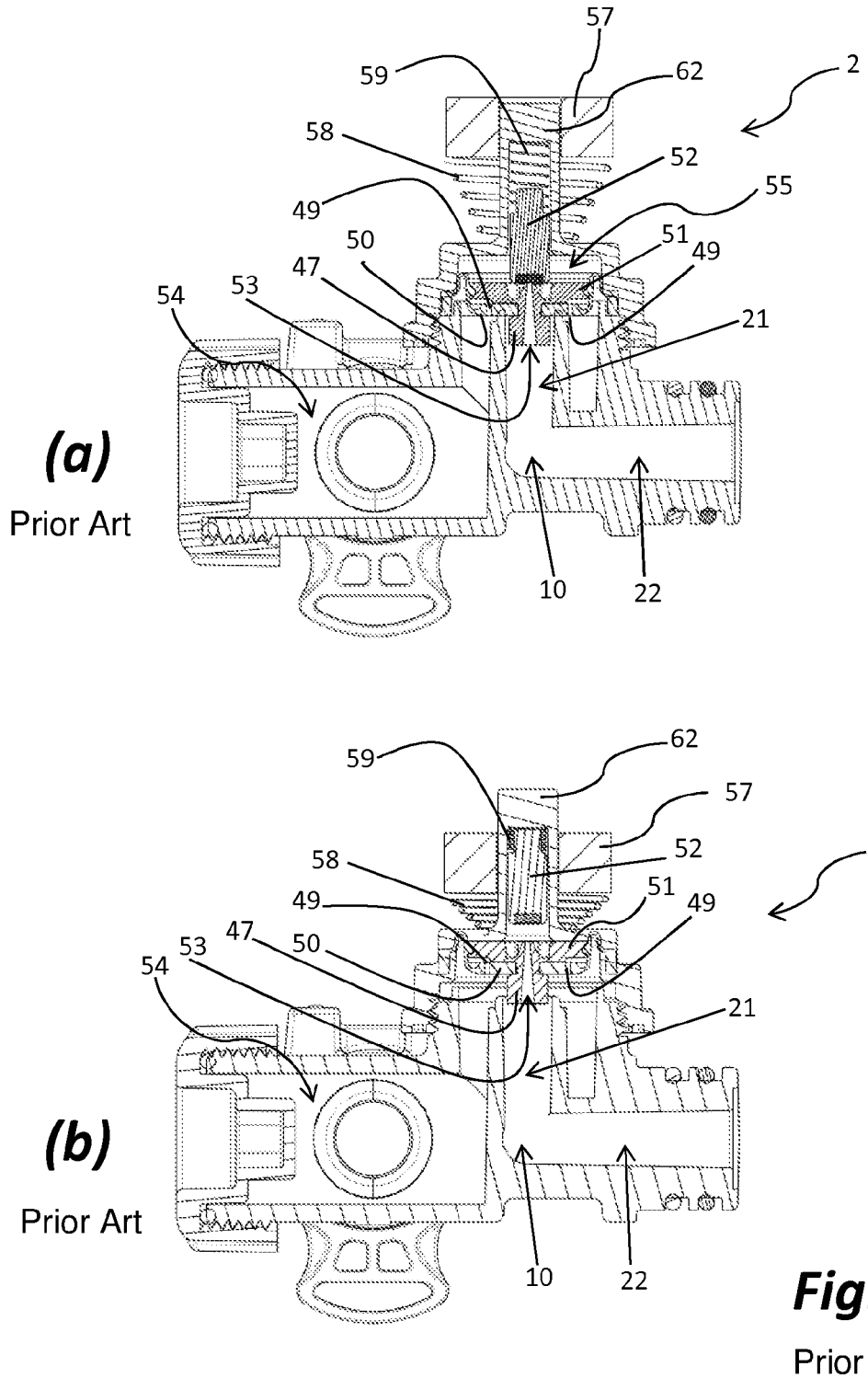

(51) Int. Cl.
*B01F 3/08* (2006.01)
*F16K 31/383* (2006.01)

(56) References Cited

U.S. PATENT DOCUMENTS

| | | | |
|---|---|---|---|
| 4,453,747 A | * | 6/1984 | Bimba .......................... 285/305 |
| 4,917,143 A | * | 4/1990 | Grooms ........................ 137/343 |
| 5,169,117 A | * | 12/1992 | Huang ....................... 251/30.03 |
| 5,758,863 A | * | 6/1998 | Buffet et al. .................... 251/28 |
| 7,017,621 B2 | | 3/2006 | Beldham et al. |
| 7,331,488 B2 | * | 2/2008 | Naslund et al. .............. 222/144 |
| 2003/0071234 A1 | * | 4/2003 | Weber et al. ................... 251/25 |
| 2009/0205593 A1 | * | 8/2009 | Huang ....................... 123/90.11 |
| 2014/0158241 A1 | * | 6/2014 | Patreangeli et al. .......... 137/843 |
| 2014/0169121 A1 | * | 6/2014 | Petrangeli et al. ........ 366/163.2 |

\* cited by examiner

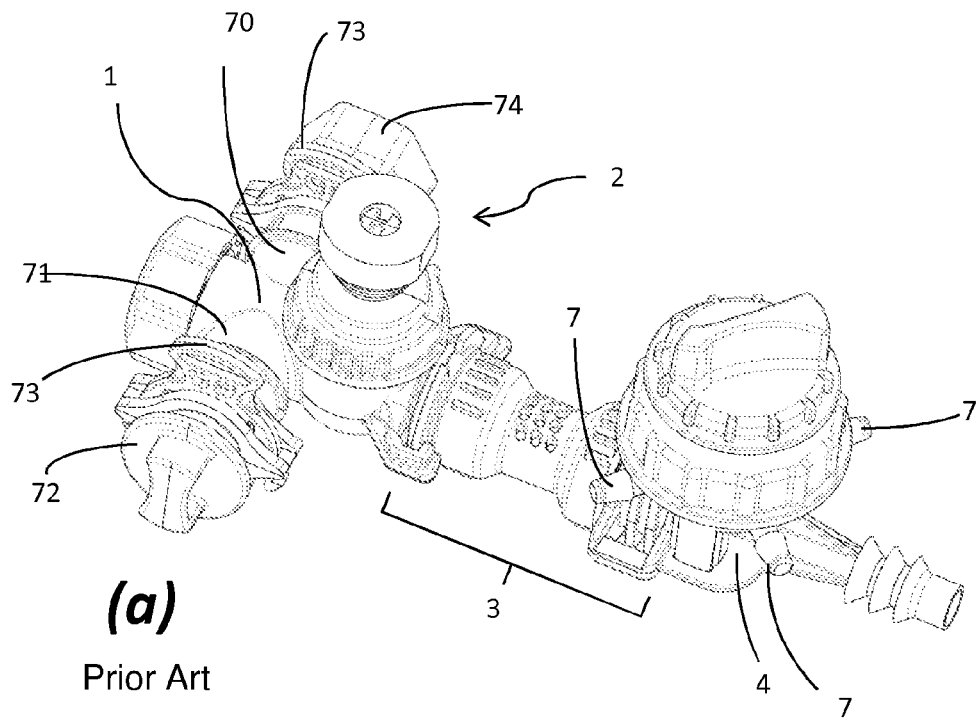
(a) Prior Art
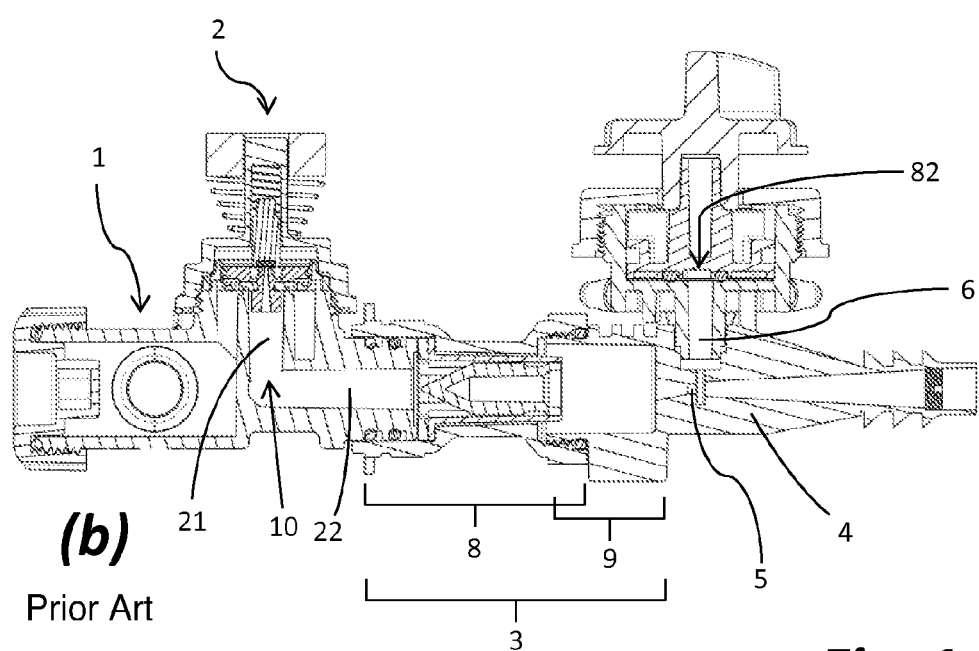
(b) Prior Art
Fig. 1
Prior Art

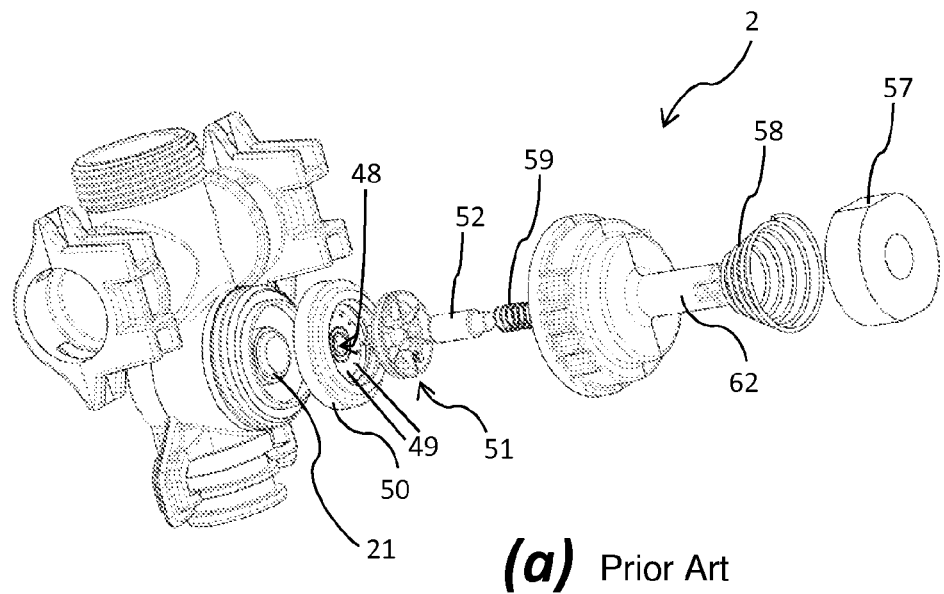
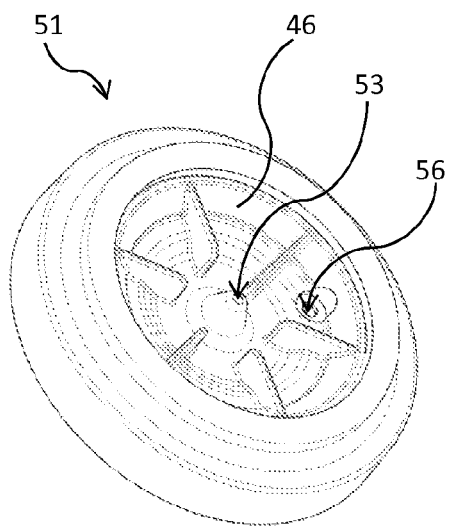 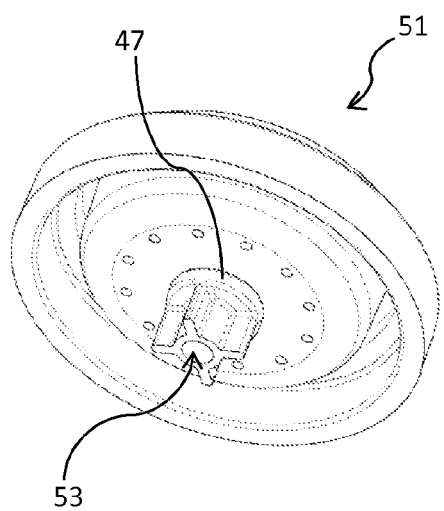
Fig. 2
Prior Art

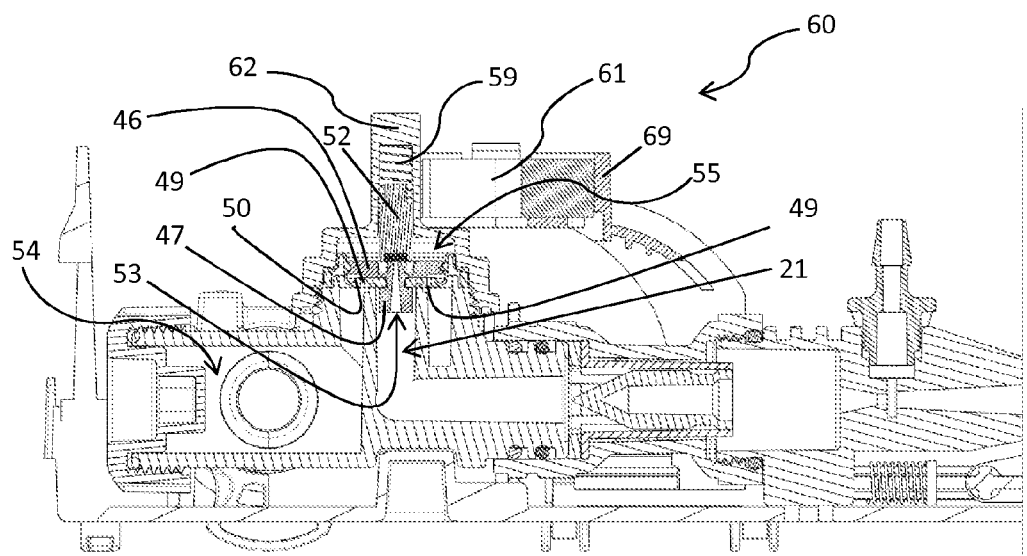
*(a)*
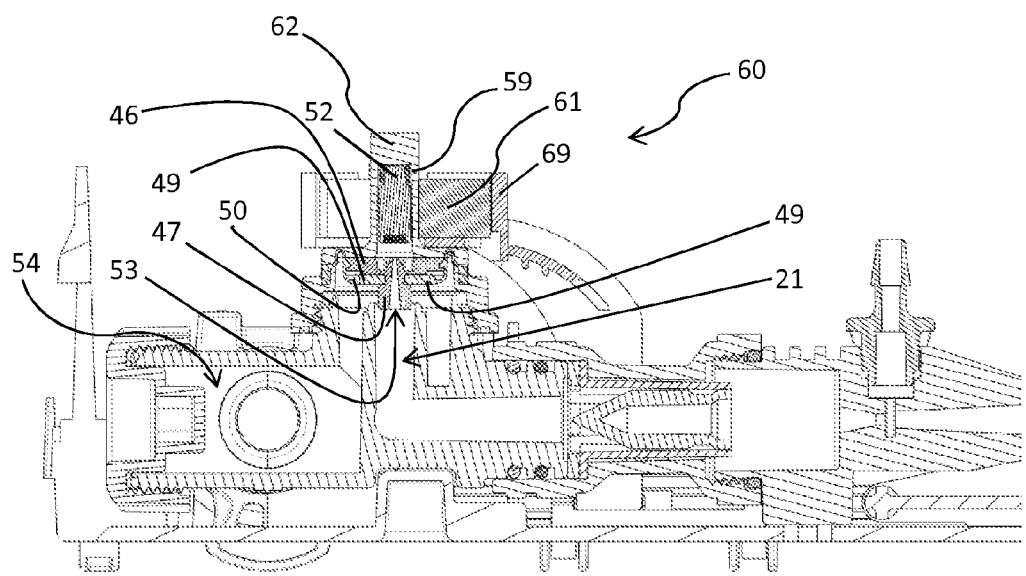
*(b)*
Fig. 4

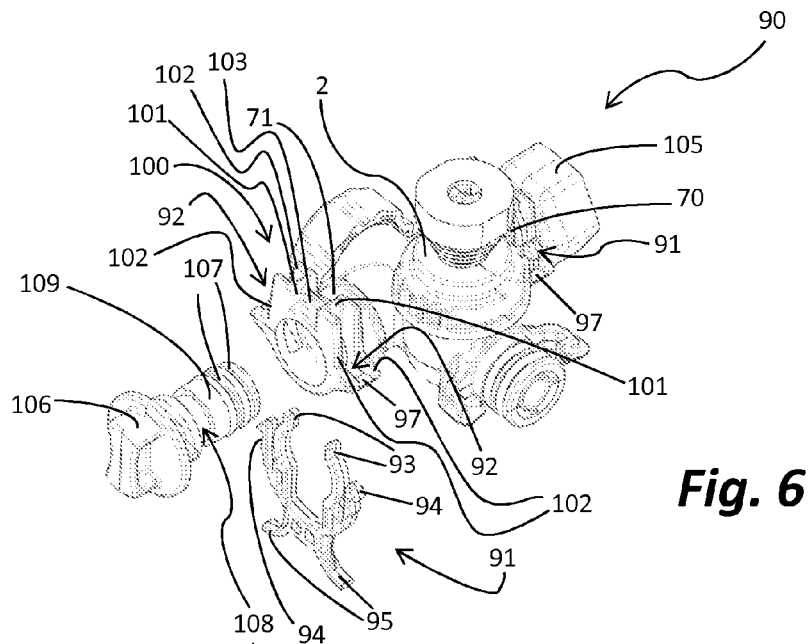
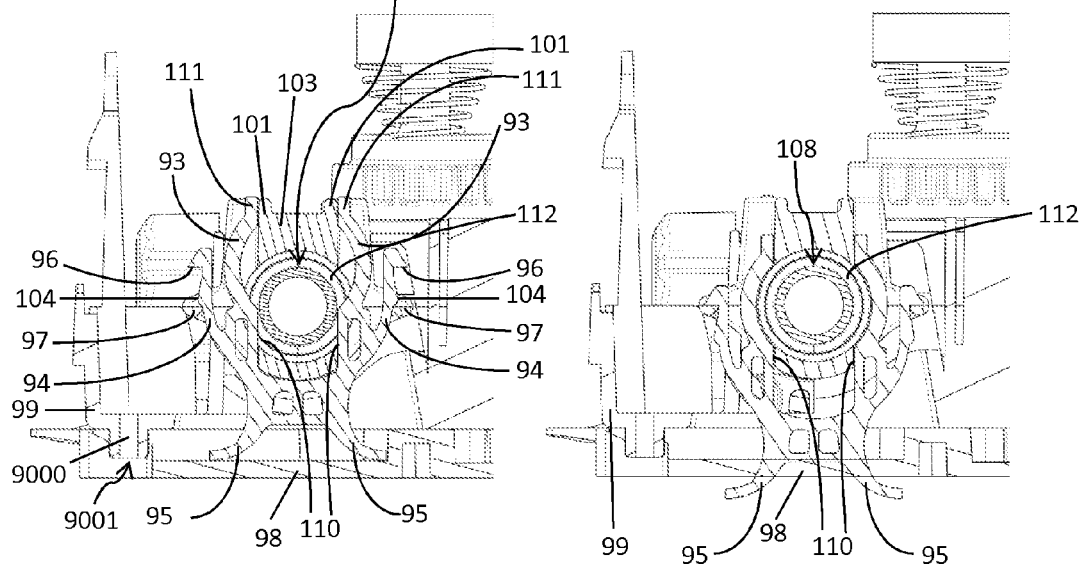
Fig. 6
(a)     Fig. 7     (b)

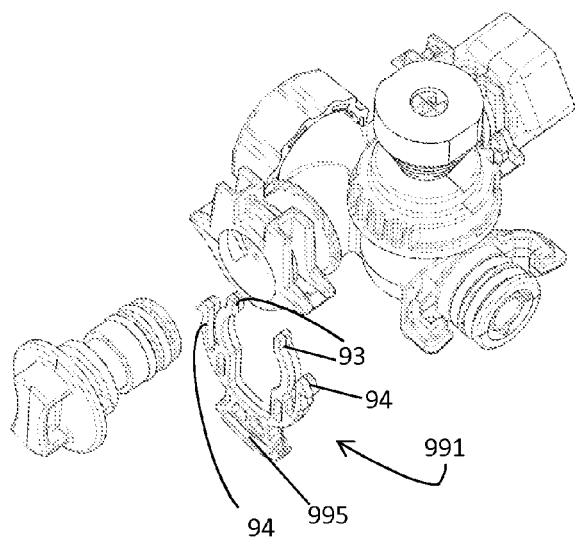
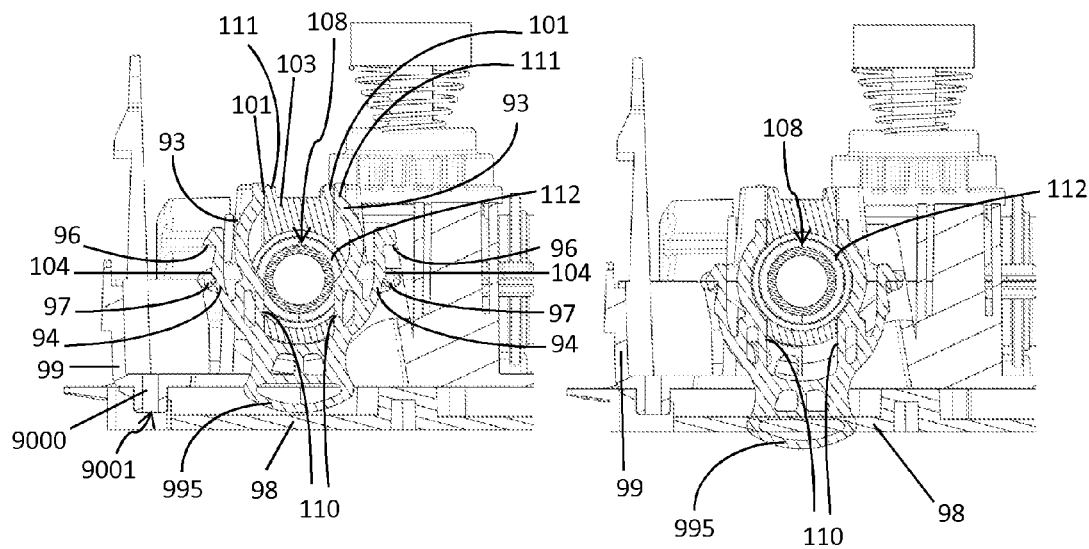
(a) Fig. 10 (b)

MAGNETICALLY ACTUATED VALVE

CROSS-REFERENCE TO THE RELATED APPLICATIONS

This application is a U.S. National phase of International Application PCT/IB2012/053702, filed on Jul. 19, 2012, which claims priority from Italian application RM2011A000387, filed on Jul. 20, 2011. The entire contents of the International and Italian applications are incorporated herein by reference.

The present invention relates to a valve magnetically actuated by a slide, in particular for a mixing apparatus, capable to operate in a manner that is reliable, efficient, inexpensive, and safe for the operators.

In the following of this description, reference will be mainly made to an application of the valve magnetically actuated by a slide according to the invention to a mixing apparatus. However, it must be noted that the magnetically actuated valve according to the invention may be applied to any apparatus, device, equipment, system wherein it is necessary to open or close a portion of hydraulic circuit, still remaining within the scope of protection of the present invention.

It is known that mixing apparatuses are widespread. In particular, in the field of cleaning and disinfection of surfaces, such apparatuses allow both treatment exclusively with water and adding of concentrated chemical products, such as for instance disinfectants, soaps, wet foams and dry foams. The apparatus described in document U.S. Pat. No. 7,017,621 B2 and the apparatus called KP1H available from the US company Knight are two examples of such mixing apparatuses.

With reference to FIG. 1, it may be observed that the hydraulic circuit of such apparatuses draws the water from the supply through a hydraulic cross connection 1, capable to operate with water pressure values up to 10 bars (i.e. $10^6$ Pascals), controlled by a magnetically actuated valve 2. The hydraulic cross connection 1, the housing case (not shown in FIG. 1) of which is mounted on the wall (directly or through a bracket) so that the magnetically actuated valve 2 is frontally accessible by an operator, comprises an inlet duct 70 upstream of the valve 2, for connecting to the supply through a connector 74, and an outlet duct 71 allowing the connection to a hydraulic cross connection of another mixing apparatus (or to any other duct) connected downstream of that shown in FIG. 1 through a similar connector (not shown in FIG. 1). In the case where the outlet duct 71 is not connected to any downstream hydraulic cross connection (or any other duct), it is closed through a stopper 72. The connector 74 and the stopper 72 are attached to the inlet duct 70 and outlet duct 71, respectively, through corresponding quick coupling removable hooks 73 frontally applied (i.e. from the same side of the magnetically actuated valve 2) by an operator.

The hydraulic cross connection 1, downstream of the magnetically actuated valve 2, comprises an elbow 10 (formed by an upstream duct 21 and a downstream duct 22) downstream of which an assembly 3 of separation valves is present, for preventing the backflow towards the chemical products supply, and, downstream of these, a mixing device 4 based on the Venturi effect, that mixes the water with the chemical product. In particular, the mixing device 4 comprises a small tube 5 wherein, upon the passage of water, a low pressure and hence an aspiration of the chemical product from an aspiration tube 6 (connected to an external tank through a mouth 82) and its dilution in water are generated. Dosage depends on the flow rate and water pressure, and it is possible to manage the dilution through proper nozzles 7 which are inserted into external tubes (not shown) for aspirating the chemical product and which adjust the percentage thereof. Such apparatuses are completely automatic and, since they are constituted only by a hydraulic system, they do not need any power supply.

The presence of the assembly 3 of separation valves is necessary because the chemical product tank are connected to the water supply of drinking water, and backflow prevention of the chemical products towards the supply must be hence guaranteed, e.g. in the case where a temporary low pressure occurs in the supply. In particular, the assembly 3 of separation valves generally comprises two cascaded valves: a flexible membrane separation valve 8, and a valve 9 with physical disconnection (wherein the flow of the liquid coming from the supply carries out a physical jump for entering the circuit comprising the mixing device 4).

A magnetically actuated valve of the prior art is described in document U.S. Pat. No. 7,017,621. With reference to FIGS. 2 and 3, it may be observed that a similar magnetically actuated valve 2 of the prior art comprises a perforated membrane 50, a shaped insert 51, a ferromagnetic metal pin 52 and an activation permanent magnet 57. The perforated membrane 50 is provided with a central through hole 48 and with a plurality of side through holes 49, the side holes 49 being preferably distributed along a circumference of diameter larger than the diameter of the inlet mouth of the duct 21 downstream, and it is attached to the shaped insert 51, preferably made of plastic, that inserts into the membrane central hole 48. In particular, the shaped insert 51 is formed by a substantially planar upper portion 46, provided with a side through hole 56 (not shown in FIG. 3), and by a lower shaped element 47 (that, in FIGS. 2 and 3, is shaped according to a cylindrical shape provided with longitudinal tongues external to the same cylindrical wall); a central through hole 53 passing through the whole shaped insert 51, i.e. both the upper portion 46 and the lower element 47. The pin 52, housed within a respective housing 62, is capable to interact with the central through hole 53 under a magnetic interaction with the activation permanent magnet 57, shaped as a perforated disc, capable to move longitudinally around the housing 62.

When the magnet 57 is in a position away from the inlet mouth of the duct 21 (as shown in FIG. 3a), the pin 52 is in the rest position (i.e. closing the valve 2) and it occludes the central hole 53 of the insert 51, whereby the water, coming from the supply, fills the main chamber 54 of the hydraulic cross connection 1, it passes through the side holes 49 of the membrane 50 and through the side hole 56 of the upper portion 46 of the insert 51, and it also fills the secondary chamber 55 where the pin 52 is. In this case, since the two chambers 54 and 55 have the same pressure, the membrane 50, also pushed by the pin 52 (in turn pushed by an internal spring 59 housed within the housing 62), rests on the side walls of the duct 21 (located upstream of the elbow 10 communicating with the separation valve assembly 3 and the subsequent mixing device 4), whereby the inlet mouth of the duct 21 remains closes (see FIG. 3a).

When the activation magnet 57 is actuated (e.g. by moving a pushbutton within which it is housed) by moving in a position closer to the inlet mouth of the duct 21 (as shown in FIG. 3b) by overcoming the resistance of an external spring 58, it magnetically interacts with the pin 51 that is pulled upwards, overcoming the resistance of the internal spring 59, and thus assuming an operating position wherein it clears the central hole 53 of the insert 51; as a consequence, the water is discharged from the secondary chamber 55 in the duct 21, generating a pressure difference between the main chamber 54 and the secondary chamber 55 pushing the membrane 50 upwards, clearing the inlet mouth of the duct 21 and letting the water pass from the main chamber 54 to the duct 21 (see FIG. 3b). In this regard, the pin 52 moves along its own longitudinal axis for assuming the rest position or the operating position. When from the operating position the pin returns to the rest position, the inlet mouth of the duct 21 is closed again to return to the situation shown in FIG. 3a.

However, the magnetically actuated valves of the prior art suffer from some drawbacks, due to the fact that they are based on a rather complex mechanical arrangement, entailing long interventions for installing and/or maintaining the magnetically actuated valve.

It is an object of this invention, therefore, to allow in a manner that is simpler, reliable, efficient, inexpensive, and safe for the operators to activate a magnetically actuated valve.

It is another object of this invention to allow in a manner that is reliable, efficient, inexpensive, fast and safe for the operators to attach stoppers and/or connectors to the hydraulic cross connection.

It is specific subject-matter of the present invention a magnetically actuated valve, in particular for a mixing apparatus, comprising:
- mechanical means for opening and closing the valve, so as to be capable to occlude and clear, respectively, a mouth of a duct mounted downstream of the valve,
- at least one ferromagnetic metal pin mobile between a rest position and an operating position, and
- at least one activation magnet mobile between a first position and a second position, said mechanical means being capable to interact with said at least one ferromagnetic metal pin so that when said at least one ferromagnetic metal pin is in a primary position, selected between said rest position and said operating position, said mechanical means closes the valve, and when said at least one ferromagnetic metal pin is in a secondary position, selected between said rest position and said operating position and different from said primary position, said mechanical means opens the valve, said at least one activation magnet being capable to magnetically interact with said at least one ferromagnetic metal pin so that when said at least one activation magnet is in said first position said at least one ferromagnetic metal pin is in said primary position, and when said at least one activation magnet is in said second position said at least one ferromagnetic metal pin is in said secondary position, the valve being characterised in that it comprises sliding mechanical means comprising a slide integrally coupled to said at least one activation magnet and mobile between an initial position and a final position, whereby said at least one activation magnet is slidable between said first and second positions so that when said sliding mechanical means is in said initial and final positions said at least one activation magnet is, respectively, in said first and second positions, said at least one activation magnet being shaped so as to comprise a slot capable to slide around said at least one ferromagnetic metal pin so that when said sliding mechanical means is in a non-interacting position, selected between said initial and final positions, said at least one ferromagnetic metal pin is in said rest position wherein said at least one activation magnet does not interact with the same, and when said sliding mechanical means is in an interacting position, selected between said initial and final positions different from the non-interacting position, said at least one ferromagnetic metal pin is moved in said operating position by an interaction with said at least one activation magnet.

Also according to the invention, said primary position may consist in said rest position of said at least one ferromagnetic metal pin, and said secondary position may consist in said operating position of said at least one ferromagnetic metal pin.

Still according to the invention, said non-interacting position may consist in said initial position of said sliding mechanical means, and said interacting position may consist in said final position of said sliding mechanical means.

Furthermore according to the invention, when said sliding mechanical means is in said non-interacting position, said at least one ferromagnetic metal pin may be in correspondence with a peripheral end of the slot or at the outside of the slot, and when said sliding mechanical means is in said interacting position, said at least one ferromagnetic metal pin may be in correspondence with the inside of the slot, preferably at a slot end within said at least one activation magnet.

Also according to the invention, said at least one activation magnet may be shaped as a disc provided with a slot.

Still according to the invention, said at least one ferromagnetic metal pin may be mobile between said rest position and said operating position along its own longitudinal axis, said at least one activation magnet being slidable between said first and second positions on a plane preferably orthogonal to said longitudinal axis of said at least one ferromagnetic metal pin.

Furthermore according to the invention, said sliding mechanical means may further comprise two side pins, integrally coupled to the slide, capable to slide within two respective liners, preferably opposed by respective springs, a fork structure having two side legs integrally coupled to the two side pins, respectively, the fork structure being integrally coupled to said at least one activation magnet.

Also according to the invention, said mechanical means for opening and closing the valve may comprise a perforated membrane attached to an insert, preferably made of plastic, provided with at least one hole, preferably a central one, capable to communicate with said mouth of the duct mounted downstream of the valve, said at least one ferromagnetic metal pin interacting with at least one corresponding inner opposing spring tending to make said at least one ferromagnetic metal pin assume said rest position, said at least one ferromagnetic metal pin being capable to interact with said at least one hole of the insert so that in said primary position said at least one ferromagnetic metal pin occludes said at least one hole of the insert, and in said secondary position said at least one ferromagnetic metal pin clears said at least one hole of the insert, said at least one ferromagnetic metal pin and said at least one corresponding inner opposing spring being preferably housed in at least one respective housing around which the slot of said at least one activation magnet is capable to slide.

It is further specific subject-matter of the present invention an apparatus for mixing a liquid, preferably water, drawn from a supply with one or more concentrated chemical products, comprising a magnetically actuated valve, characterised in that the magnetically actuated valve is the magnetically actuated valve as previously described.

Further embodiments of the mixing apparatus according to the invention are defined in the dependent claim 10.

The operation through the slide of the magnetically actuated valve according to the invention allows to have a simple and stable operation of the magnet, drastically reducing the need for maintenance interventions.

The mixing apparatus comprising the magnetically actuated valve according to the invention allows to reach all the aforementioned objects.

Figure 5:
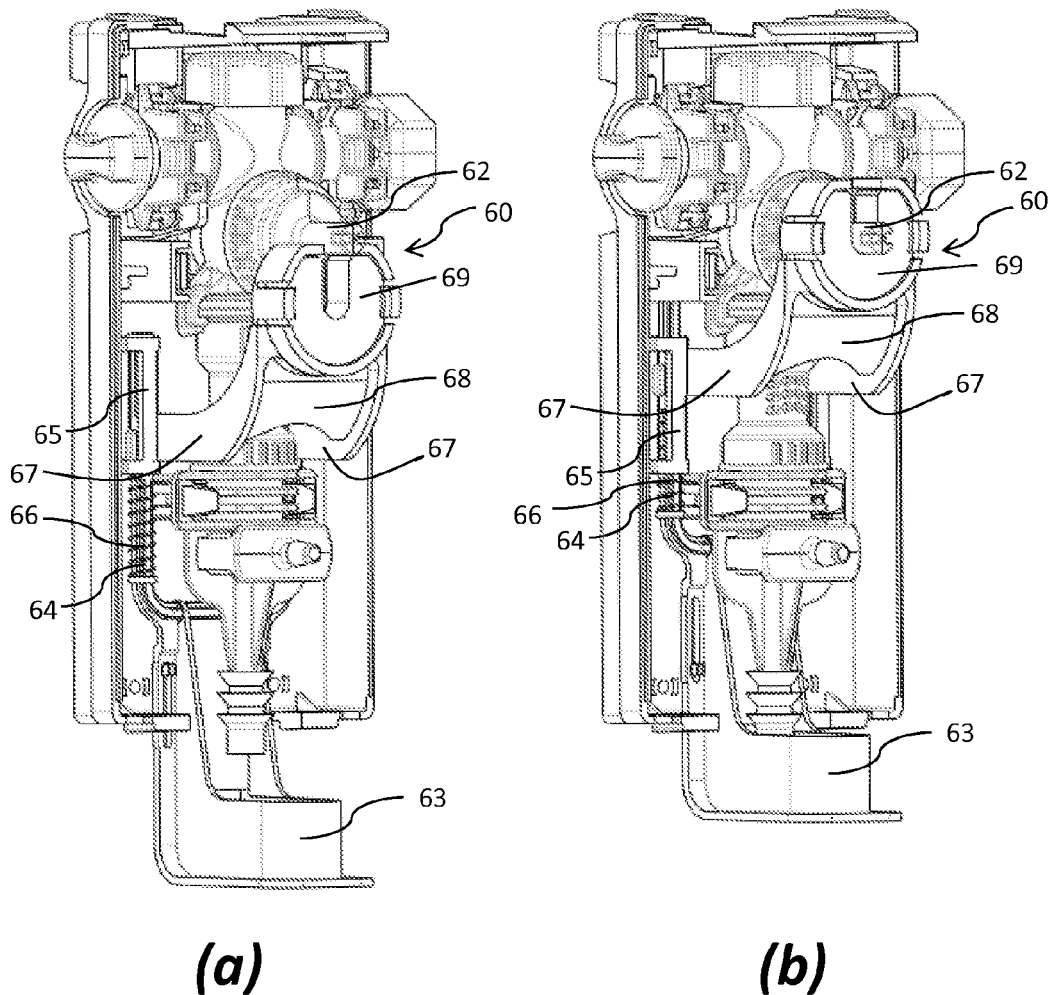
Figure 8:
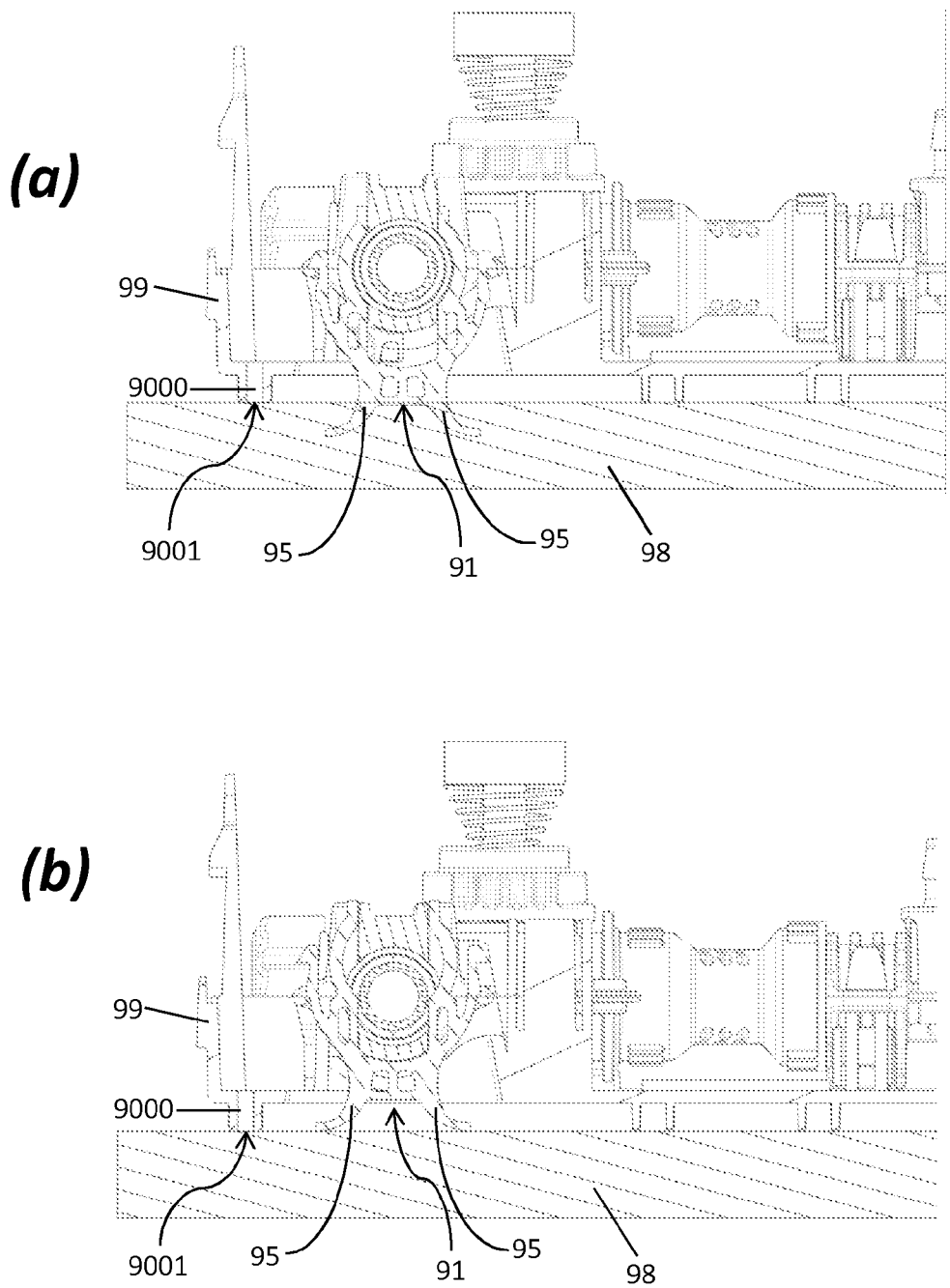

The present invention will be now described, by way of illustration and not by way of limitation, according to its preferred embodiments, by particularly referring to the Figures of the annexed drawings, in which:

FIG. 1 schematically shows a perspective view (FIG. 1a) and a longitudinal cross-section view (FIG. 1b) of the hydraulic circuit of a mixing apparatus according to the prior art;

FIG. 2 schematically shows an exploded perspective view (FIG. 2a) of a magnetically actuated valve according to the prior art and a top perspective view (FIG. 2b) and a bottom perspective view (FIG. 2c) of a membrane-insert assembly of such magnetically actuated valve according to the prior art;

FIG. 3 schematically shows a longitudinal cross-section of a portion of a mixing apparatus comprising the magnetically actuated valve of FIG. 2 in a closed configuration (FIG. 3a) and in an open configuration (FIG. 3b);

FIG. 4 schematically shows a longitudinal cross-section of a portion of a preferred embodiment of the magnetically actuated valve according to the invention in a closed configuration (FIG. 4a) and in an open configuration (FIG. 4b);

FIG. 5 schematically shows a perspective view of the mixing apparatus comprising the magnetically actuated valve of FIG. 4 in the closed configuration (FIG. 5a) and in the open configuration (FIG. 5b);

FIG. 6 schematically shows a perspective view of the hydraulic cross connection of a second embodiment of the mixing apparatus according to the invention;

FIG. 7 schematically shows a longitudinal cross-section of a portion of the hydraulic cross connection of FIG. 6 in an attachment configuration (FIG. 7a) and in an open configuration (FIG. 7b);

FIG. 8 schematically shows a longitudinal cross-section of a portion of a fourth embodiment of the mixing apparatus according to the invention in an open configuration (FIG. 8a) and in an attachment configuration (FIG. 8b);

FIG. 9 schematically shows a perspective view of a further embodiment of the hydraulic cross connection according to the invention; and FIG. 10 schematically shows a longitudinal cross-section of a portion of the hydraulic cross connection of FIG. 9 in an attachment configuration (FIG. 10a) and in an open configuration (FIG. 10b).

In the Figures identical reference numerals will be used for alike elements.

With reference to FIGS. 4 and 5, it may be observed that a preferred embodiment of the magnetically actuated valve 60 according to the invention comprising, similarly to the valve of FIGS. 2 and 3:

a perforated membrane 50, provided with a central through hole and a plurality of side through holes 49, a shaped insert 51 that inserts into the central hole of the membrane 50 and that is formed by an upper portion 46, provided with a side through hole (not shown in FIGS. 4 and 5), and by a lower shaped element 47 and provided with a central through hole 53, a ferromagnetic metal pin 52 housed within a respective housing 62, and an activation magnet 61 housed within a corresponding housing 69 (partially removed in FIG. 4).

The interaction among the pin 52, the central through hole 53 of the insert 51 and the inlet mouth of the duct 21 is similar to the case of the valve of FIGS. 2 and 3. In particular, the pin 52 may assume two positions: a rest position in which it closes the valve 60, and an operating position, in which it opens the valve 60. In particular, the pin 52 moves along its own longitudinal axis for assuming the rest position or the operating position.

More in detail, in the rest position the pin 52 occludes the central hole 53 of the insert 51 and the water, coming from the supply, fills the main chamber 54 of the hydraulic cross connection 1, it passes through the side holes 49 of the membrane 50 and of the upper portion 46 of the insert 51, and it also fills the secondary chamber 55 where the pin 52 is; since the two chambers have the same pressure, the membrane 50, also pushed by the pin 52 (in turn pushed by an internal spring 59 housed within the housing 62), rests on the side walls of the duct 21 communicating with the hydraulic circuit downstream of the activation valve 60, whereby the inlet mouth of the duct 21 remains closed (see FIG. 4a).

In the operating position, the pin 52 is moved upwards, overcoming the resistance of the internal spring 59, and it clears the central hole 53 of the insert 51 of the membrane 50; as a consequence (similarly to what occurs for the magnetically actuated valve of FIGS. 2 and 3), the water is discharged from the secondary chamber 55 in the duct 21, generating a pressure difference between the main chamber 54 and the secondary chamber 55 pushing the membrane 50 upwards, clearing the inlet mouth of the duct 21 and letting the water pass from the main chamber 54 to the duct 21 (see FIG. 4b).

The pin 52 is moved between the rest position and the operating position by the interaction with an activation magnet 61 shaped as a disc provided with a slot that is capable to slide around the housing 62 within which the pin 52 is housed. In other words, the activation magnet 61 is substantially U-shaped, so as to be capable to slide between two positions: a first position corresponding to the rest position of the pin 52, wherein (the housing 62 of) the latter is at a peripheral end of the slot (or, alternatively, outside the slot) where the interaction of the magnet 61 is not sufficient to move the pin 52 from the rest position overcoming the resistance of the internal spring 59 (see FIG. 4a and FIG. 5a); and a second position corresponding to the operating position of the pin 52, wherein (the housing 62 of) the latter is at a central end of the slot (or, alternatively, in a position inside the slot), i.e. at the centre of the disc of the magnet 61, where the interaction of the magnet 61 is sufficient to move the pin 52 for making it assume the operating position (see FIG. 4b and FIG. 5b).

The magnet 61 assumes the first and second positions by sliding on a plane orthogonal to the longitudinal axis of the pin 52. To this end, as better shown in FIG. 5, the magnetically actuated valve 60 is provided with a sliding mechanism integrally coupled to the magnet 61 actuatable by an operator so that a sliding of the sliding mechanism corresponds to a sliding of the magnet 61. In particular, the sliding mechanism shown in FIG. 5 comprises a slide 63 integrally coupled to two side pins (only the left pin 64 of which is visible in FIG. 5) capable to slide within two respective liners 65 by overcoming the resistance of respective springs (only the left spring 66 of which is visible in FIG. 5). The two side legs 67 of a fork structure 68 are integrally coupled to the two side pins 64, respectively; the fork structure 68 is integrally coupled to the magnet 61. Therefore, when the slide 63 is in a position projecting downwardly from the mixing apparatus housing, the magnet 61 is in the first position, corresponding to the rest position of the pin 52 (see FIG. 5*a*), whereas when the slide 63 is in a position more inside the mixing apparatus housing, the magnet 61 is in the second position, corresponding to the operating position of the pin 52 (see FIG. 5*b*).

Other embodiments of the magnetically actuated valve according to the invention may have the magnet 61 slidable on a plane not strictly orthogonal to the axis of the pin 52; by way of example, and not by way of limitation, the sliding of the magnet 61 could be such that it allows an approach of the magnet 61 to the mouth of the duct 21 when it passes from the first position to the second one, for increasing the magnetic interaction of the same magnet 61 with the pin 52.

Further embodiments of the magnetically actuated valve according to the invention may have the magnet 61 with a shape different from the disc (e.g. it could be square or rectangular), though maintaining the presence of a slot.

Other embodiments of the magnetically actuated valve according to the invention may comprise mechanical means for opening and closing the valve 60 different from the perforated membrane 50 and from the insert 51 provided with central hole 53, although such different mechanical means must always interact with a ferromagnetic metal pin interacting with a magnet having a slot capable to slide around (the housing of) the pin when the magnet is moved by a slide. In particular, such mechanical means may also consist of an element integrally coupled to the ferromagnetic metal pin, such as for instance an end of such metal pin, whereby the interaction between mechanical means and pin may also consist in a movement of the mechanical means that is integral with a movement of the pin.

Further embodiments of the magnetically actuated valve according to the invention may have an inversion of the rest and operating positions of the pin, whereby in the rest position the latter opens the valve and in the operating position it closes the valve.

With reference to FIG. 6, it may be observed that a second embodiment of the mixing apparatus according to the invention comprises a hydraulic cross connection 90 comprising upstream of the valve 2 an inlet duct 70, for the connection to the water supply through a connector 105 (preferably upstream of which the connection with the supply comprises a tap for opening or closing the communication between inlet duct 70 and supply), and an outlet duct 71 closed through a stopper 106. It must be considered that the outlet duct 71 could be also connected to a hydraulic cross connection of another mixing apparatus (or to any other duct).

The connector 105 and the stopper 106 are attached to the inlet duct 70 and outlet duct 71, respectively, through corresponding quick coupling removable hooks 91 which are applied posteriorly, i.e. from the side of the hydraulic cross connection 90 facing the housing case (not shown in FIG. 6) that is mounted on the wall directly or through a bracket. The stopper 106 comprises a longitudinal tube 109, configured to be inserted into the outlet duct 71, that is provided with two sealing gaskets 107 and that has a circular notch 108 configured to interact with the hook 91, as it will be better illustrated later; similarly, the connector 105 comprises a longitudinal tube configured to be inserted into the inlet duct 70, that is provided with one or more sealing gaskets and that has a circular notch, similar to the notch 108 of the stopper 106, configured to interact with the respective hook 91.

Making reference also to FIG. 7, each one of the quick coupling removable hooks 91 is insertable into a seat 100 obtained on the outer wall of the outlet duct 71 (an identical seat is present on the outer wall of the inlet duct 70); each quick coupling removable hook 91 comprises two pairs symmetric to each other of front elastic arms, each one comprising an inner front elastic arm 93 and an outer front elastic arm 94, each pair being configured to insert into one of two corresponding side slots 92 of the seat 100.

A tooth 96 that is present on each one of the outer front elastic arms 94, by interacting as a stop with a side edge 97 of the respective side slot 92 of the seat 100, is configured to prevent the hook 91 from sliding in an unforced way outside the seat (i.e. unless an operator press the outer front elastic arms 94 towards the inner front elastic arms 93), whereas a frontally projecting element 103 of the seat 100 is provided with two stopping side elements 101 interacting with the ends 111 of the two inner front elastic arms 93 for maintaining the correct angular orientation of the hook 91 with respect to the axis of the outlet duct 71; moreover, the seat 100 further comprises two pairs of shaped ribs 102 projecting from the outer wall of the duct 71, which contribute (along with the side edge 97 joining them) to form the side slots 92, and which maintains the longitudinal position of the hook 91. A shaped profile of the external edge of each one of the outer front elastic arms 94, ending with a projection 104, advantageously interacts with the side edge 97 of the respective side slot 92 of the seat 100 for favouring the correct radial positioning of the hook 91, i.e. its positioning at the correct distance from the longitudinal axis of the outlet duct 71.

FIG. 7 shows a portion of the housing case 99 housing the hydraulic cross connection 90; in particular, the housing case 99 is configured to be mounted, preferably in a removable way, on a rear planar support 98 (that may comprise or consist of a bracket or a mounting wall). The removable hook 91 further comprises two rear arms 95, symmetric to each other, interacting as stops with the bracket 98, mounted on a wall, on which the housing case 99 of the hydraulic cross connection 90 is mounted; in particular, the reference numeral 98 of FIG. 7 could also indicate the wall on which the case 99 can be directly mounted. In this regard, the housing case 99 comprises one or more supporting rear elements, each one having a supporting free end configured to rest on the rear planar support 98 when the housing case 99 is mounted on the same rear planar support 98 (that may comprise or consist of a bracket or a mounting wall). By way of example and not by way of limitation, the housing case 99 may comprise as supporting rear element a rear wall of the same case, which rear wall is configured to be attached, preferably in a removable way, to a supporting planar wall, e.g. by means of screws removably insertable, thanks to through holes of such rear wall, into corresponding block inserted into the supporting planar wall, or by means of bolts removably anchored, thanks to through holes of such rear wall, to a supporting planar bracket or through clamps removably securable to a supporting planar bracket; in this case, the free surface operates as supporting free end of the rear wall, in turn operating as supporting rear element, of the housing case 99. Still by way of example and not by way of limitation, the housing case 99 may comprise, as supporting rear elements, supporting projecting elements, as for instance pins 9000, the free ends 9001 of which operate as supporting free ends; in this case, the housing case 99 may be mounted, preferably in a removable way, on a supporting planar wall or a supporting planar bracket through securing means as screws, bolts, and clamps.

As shown in FIG. 7a, when the removable hook 91 is correctly closed, it is secured in the seat 100 so that the two pairs of front elastic arms, 93 and 94, are inserted into the respective two slots 92, the two inner front elastic arms 93 interact as stops with the two side elements 101 of the frontally projecting element 103, and the two rear arms 95 interact as stops with the mounting bracket (or the wall) 98, since the housing case 99 of the hydraulic cross connection is shaped such that, when mounted on the mounting bracket (or on the wall) 98, the distance separating the seat 100 from the mounting bracket (or from the wall) 98 is the minimum distance that is sufficient for housing (the rear portion of the hook 91 and) the two rear arms 95 of the hook 91. Such distance is equal to the distance separating the seat 100 from the supporting free ends of said one or more supporting rear elements of the housing case 99 (i.e., in FIG. 3, to the distance separating the seat 100 from the free ends 9001 of the supporting pins 9000). In such attachment configuration, an internal edge 110 of each one of the two inner front elastic arms 93 inserts into the notch 108 of the stopper 106 and it interacts as a stop with the ends of the adjacent portions of the tube 109 delimiting the notch 108 (only the end 112 of the proximal portion is visible in FIG. 7), keeping the stopper 106 locked.

In particular, in the present description and claims it must be understood that the distance separating the seat 100 from the supporting free ends of said one or more supporting rear elements of the housing case 99 (i.e. the distance separating the seat 100 from the mounting bracket 98 or from the wall) is equal to the length of the minimum straight line separating the base of the notch 108 from the planar surface passing through the supporting free ends of said one or more supporting rear elements of the housing case 99 (i.e. the minimum straight line separating the base of the notch 108 from the bracket or from the wall 98).

In order that the stopper 106 can be released from the outlet duct 71, it is necessary that the removable hook 91 moves posteriorly to the hydraulic cross connection 90, as shown in FIG. 7b, until the internal edge 110 of each one of the two inner front elastic arms 93 exits from the notch 108 of the stopper 106 allowing the latter to move longitudinally. However, in order that this is possible, it is further necessary that there is the space required by the posterior movement of the two rear arms 95, and such condition only occurs when the housing case 99 of the hydraulic cross connection 90 is not mounted on the mounting bracket (or on the wall) 98, i.e. in a condition wherein the hydraulic cross connection is disconnected from the supply. In other words, the stopper 106 may exit from the outlet duct 71 only if the housing case 99 of the hydraulic cross connection 90 is not mounted on the mounting bracket (or on the wall) 98, since otherwise the mounting bracket (or the wall) 98 prevents the hook 91 from opening.

With reference to FIG. 8, it may be observed that a third embodiment of the mixing apparatus according to the invention comprises a hydraulic cross connection differing from that illustrated with reference to FIGS. 6 and 7 by the fact that the housing case 99 of the hydraulic cross connection 90 is shaped so that, when mounted on the wall (or on the mounting bracket) 98, the distance separating the seat 100 from the supporting free ends of said one or more supporting rear elements of the housing case 99 (i.e. the distance separating the seat 100 from the free ends 9001 of the supporting pins 9000, that is equal to the distance separating the seat 100 from the mounting bracket—or from the wall—98) is longer than the minimum distance that is sufficient for housing the two rear arms 95 of the hook 91; in particular, such distance is equal to the sum of the minimum distance sufficient for housing the two rear arms 95 of the hook 91 with a second distance shorter than the depth of the notch 108 of the stopper 106. In such case, when the housing case 99 of the hydraulic cross connection 90 is mounted on the wall (or on the mounting bracket) 98, the hook 91 cannot in any case move posteriorly to the hydraulic cross connection 90 by a distance that is sufficient to the internal edge 110 of each one of the two inner front elastic arms 93 for exiting from the notch 108 of the stopper 106, thus preventing the latter from moving longitudinally.

In general, the housing case 99 of the hydraulic cross connection 90 is shaped so that the distance separating the seat 100 from a planar surface passing through each supporting free end of said one or more supporting rear elements of the housing case 99 (e.g. the distance separating the seat 100 from a planar surface passing through the free ends 9001 of the supporting pins 9000 in FIGS. 3 and 4), that is equal to the distance separating the seat 100 from the wall (or from the mounting bracket) 98 (when the housing case 99 is mounted on the mounting bracket—or on the wall—98), ranges from a minimum value equal to the minimum distance that is sufficient for housing the two rear arms 95 of the hook 91, including such minimum value, and a maximum value equal to the sum of the minimum distance that is sufficient for housing the two rear arms 95 of the hook 91 with the depth of the notch 108 of the stopper 106, excluding such maximum value.

What described above with reference to the stopper 106 is also valid with reference to the connector 105.

Other embodiments of the mixing apparatus according to the invention comprise a hydraulic cross connection that may have the hook comprising, instead of two pairs symmetric to each other of front elastic arms, two front elastic arms symmetric to each other, each one of which may be shaped so as to comprise the tooth 96 and/or the ends 111 and/or an external edge having a shaped profile ending with the projection 104 and/or the internal edge 110.

Further embodiments of the mixing apparatus according to the invention comprise a hydraulic cross connection that may have the hook comprising, instead of two rear arms 95, a single rear arm. By way of example, FIG. 9 shows an embodiment of the hydraulic cross connection according to the invention differing from the one shown in FIG. 6 by the fact that the hook 991 comprises a single arc-shaped rear arm 995 that projects posteriorly from the hook 991 (whereas the other elements of the hook 991 are the same ones of the hook 91 of FIGS. 6-8). As schematically shown in FIG. 10 for the attachment configuration (FIG. 10a) and for the open configuration (FIG. 10b), the operation of the hook 991 is similar to that of the hook 91 schematically shown in FIG. 7.

Also, other embodiments of the mixing apparatus according to the invention comprise a hydraulic cross connection that may have mechanical means for positioning the hook different from the two side slots 92 comprising the side edge 97 of the seat 100, and/or from the frontally projecting element 103 of the seat 100 provided with two stopping side elements 101, and/or from the ends of the portions of the tube 109 delimiting the notch 108.

The preferred embodiments of this invention have been described and a number of variations have been suggested hereinbefore, but it should be understood that those skilled in the art can make other variations and changes, without so departing from the scope of protection thereof, as defined by the enclosed claims.

The invention claimed is:

1. A magnetically actuated valve comprising:
   mechanical means for opening and closing the magnetically actuated valve, so as to be configured to occlude and clear, respectively, a mouth of a duct mounted downstream of the magnetically actuated valve,
   at least one ferromagnetic metal pin movable between a rest position and an operating position, and
   at least one activation magnet movable between a first position and a second position,
   said mechanical means being configured to interact with said at least one ferromagnetic metal pin so that when said at least one ferromagnetic metal pin is in said rest position, said mechanical means closes the magnetically actuated valve, and when said at least one ferromagnetic metal pin is in said operating position, said mechanical means opens the magnetically actuated valve,
   said at least one activation magnet being configured to magnetically interact with said at least one ferromagnetic metal pin so that when said at least one activation magnet is in said first position, said at least one ferromagnetic metal pin is in said rest position, and when said at least one activation magnet is in said second position, said at least one ferromagnetic metal pin is in said operating position,
   wherein the magnetically actuated valve comprises sliding mechanical means including a slide integrally coupled to said at least one activation magnet and being movable between an initial position and a final position, whereby said at least one activation magnet is slidable between said first and second positions so that when said sliding mechanical means is in said initial and final positions said at least one activation magnet is, respectively, in said first and second positions,
   said at least one activation magnet being shaped so as to include a slot configured to slide around said at least one ferromagnetic metal pin so that when said sliding mechanical means is in said initial position said at least one ferromagnetic metal pin is in said rest position, wherein said at least one activation magnet does not interact with the same, and when said sliding mechanical means is in said final position said at least one ferromagnetic metal pin is moved to said operating position by an interaction with said at least one activation magnet, wherein said at least one ferromagnetic metal pin is movable between said rest position and said operating position along its own longitudinal axis,
   said at least one activation magnet being slidable between said first and second positions on a plane, wherein said plane is orthogonal to said longitudinal axis of said at least one ferromagnetic metal pin.

2. The magnetically actuated valve according to claim 1, wherein said primary position corresponds to said rest position of said at least one ferromagnetic metal pin, and said secondary position corresponds to said operating position of said at least one ferromagnetic metal pin.

3. The magnetically actuated valve according to claim 1, wherein said non-interacting position corresponds to said initial position of said sliding mechanical means, and said interacting position corresponds to said final position of said sliding mechanical means.

4. The magnetically actuated valve according to claim 1, wherein when said sliding mechanical means is in said non-interacting position, said at least one ferromagnetic metal pin is in correspondence with a peripheral end of the slot or at the outside of the slot, and when said sliding mechanical means is in said interacting position, said at least one ferromagnetic metal pin is in correspondence with the inside of the slot.

5. The magnetically actuated valve according to claim 4, wherein said at least one ferromagnetic metal pin is at a slot end within said at least one activation magnet.

6. The magnetically actuated valve according to claim 1, wherein said at least one activation magnet is shaped as a disc provided with said slot.

7. The magnetically actuated valve according to claim 1, wherein said sliding mechanical means further comprises two side pins, integrally coupled to the slide, configured to slide within two respective liners, a fork structure having two side legs integrally coupled to the two side pins, respectively, the fork structure being integrally coupled to said at least one activation magnet.

8. The magnetically actuated valve according to claim 1, wherein said mechanical means for opening and closing the magnetically actuated valve comprises a perforated membrane attached to an insert provided with at least one hole configured to communicate with said mouth of the duct mounted downstream of the magnetically actuated valve, said at least one ferromagnetic metal pin interacting with at least one corresponding inner opposing spring tending to make said at least one ferromagnetic metal pin assume said rest position, said at least one ferromagnetic metal pin being configured to interact with said at least one hole of the insert so that in said primary position, said at least one ferromagnetic metal pin occludes said at least one hole of the insert, and in said secondary position, said at least one ferromagnetic metal pin clears said at least one hole of the insert.

9. The magnetically actuated valve according to claim 8, wherein said insert is made of plastic.

10. The magnetically actuated valve according to claim 8, wherein said at least one hole with which said insert is provided is central.

11. The magnetically actuated valve according to claim 8, wherein said at least one ferromagnetic metal pin and said at least one corresponding inner opposing spring are housed in at least one respective housing around which the slot of said at least one activation magnet is capable to slide.

12. Apparatus for mixing a liquid drawn from a supply with one or more concentrated chemical products, comprising a magnetically actuated valve, wherein the magnetically actuated valve comprises:
   mechanical means for opening and closing the magnetically actuated valve, so as to be configured to occlude and clear, respectively, a mouth of a duct mounted downstream of the magnetically actuated valve,
   at least one ferromagnetic metal pin movable between a rest position and an operating position, and
   at least one activation magnet movable between a first position and a second position,
   said mechanical means being configured to interact with said at least one ferromagnetic metal pin so that when said at least one ferromagnetic metal pin is in said rest position, said mechanical means closes the magnetically actuated valve, and when said at least one ferromagnetic metal pin is in said operating position, said mechanical means opens the magnetically actuated valve,
   said at least one activation magnet being configured to magnetically interact with said at least one ferromagnetic metal pin so that when said at least one activation magnet is in said first position, said at least one ferromagnetic metal pin is in said rest position, and when said at least one activation magnet is in said second position, said at least one ferromagnetic metal pin is in said operating position, wherein the magnetically actuated valve comprises sliding mechanical means including a slide integrally coupled to said at least one activation magnet and movable between an initial position and a final position, whereby said at least one activation magnet is slidable between said first and second positions so that when said sliding mechanical means is in said initial and final positions, said at least one activation magnet is, respectively, in said first and second positions, said at least one activation magnet being shaped so as to include a slot configured to slide around said at least one ferromagnetic metal pin so that when said sliding mechanical means is in said initial position said at least one ferromagnetic metal pin is in said rest position, wherein said at least one activation magnet does not interact with the same, and when said sliding mechanical means is in said final position said at least one ferromagnetic metal pin is moved to said operating position by an interaction with said at least one activation magnet, wherein said at least one ferromagnetic metal pin is movable between said rest position and said operating position along its own longitudinal axis, said at least one activation magnet being slidable between said first and second positions on a plane, and wherein said plane is orthogonal to said longitudinal axis of said at least one ferromagnetic metal pin.

13. The apparatus for mixing a liquid according to claim 12, further comprising:

a hydraulic cross connection, housed in a housing case configured to be mounted on a rear planar support, the housing case comprising one or more supporting rear elements, each one having a free supporting end configured to rest on the rear planar support when the housing case is mounted on the same rear planar support, the hydraulic cross connection comprising at least one inlet duct and/or at least one outlet duct, at least one tubular element having a longitudinal tube removably insertable in each one of said at least one inlet duct and/or at least one outlet duct, the longitudinal tube externally comprising a circular notch, having a depth, delimited by ends of two portions of the longitudinal tube adjacent to the circular notch, at least one quick coupling removable hook, configured to be inserted in a seat obtained on an outer wall of each one of said at least one inlet duct and/or at least one outlet duct, said at least one removable hook comprising at least one first front elastic arm and at least one second front elastic arm configured to interact with the seat and with the ends of the two portions of the longitudinal tube delimiting the circular notch of the longitudinal tube when inserted in one of said at least one inlet duct and/or at least one outlet duct to which the seat belongs for locking the longitudinal tube, said at least one quick coupling removable hook being configured to be posteriorly inserted in the seat and comprising at least one rear arm, a distance separating the seat of each one of said at least one inlet duct and/or at least one outlet duct from a planar surface passing through each free supporting end of said one or more supporting rear elements of the housing case ranging from a minimum value equal to the minimum distance sufficient for housing said at least one rear arm when said at least one removable hook is inserted in the seat, including such minimum value, and a maximum value equal to the sum of the minimum distance sufficient for housing said at least one rear arm when said at least one removable hook is inserted in the seat with said depth of the notch of the longitudinal tube when inserted in one of said at least one inlet duct and/or at least one outlet duct to which the seat belongs, excluding such maximum value, whereby said at least one removable hook is removable from the seat and the longitudinal tube is extractable from the inlet or outlet duct to which the seat belongs only when the housing case is not mounted on the rear planar support.

14. The apparatus for mixing a liquid according to claim 13, wherein said distance separating the seat of each one of said at least one inlet duct and/or at least one outlet duct from the rear planar support is equal to the minimum distance sufficient for housing said at least one rear arm when said at least one removable hook is inserted in the seat, wherein said at least one quick coupling removable hook comprises a first inner front elastic arm, a first outer front elastic arm, a second inner front elastic arm, and a second outer front elastic arm, the first and the second inner front arms being configured to interact with the ends of the two portions of the longitudinal tube delimiting the circular notch of the longitudinal tube when inserted in one of said at least one inlet duct and/or at least one outlet duct to which the seat belongs for locking the longitudinal tube, the first inner front elastic arm and the first outer front elastic arm being symmetric, respectively, to the second inner front elastic arm and to the second outer front elastic arm, wherein said at least one quick coupling removable hook comprises two rear arms symmetric to each other, wherein the seat of each one of said at least one inlet duct and/or at least one outlet duct comprises positioning mechanical means configured to interact with said at least one first front elastic arm and at least one second front elastic arm for positioning said at least one removable hook in the seat, said positioning mechanical means comprising two side slots formed by two shaped ribs projecting from the outer wall of the inlet or outlet duct to which the seat belongs and by two respective side edges joining said two ribs, said at least one first front elastic arm and at least one second front elastic arm being configured to insert in the two side slots which keep a longitudinal position of said at least one removable hook with respect to an axis of the inlet or outlet duct to which the seat belongs, said positioning mechanical means comprising a frontally projecting element provided with two stopping side elements configured to interact with two corresponding ends of said at least one first front elastic arm and at least one second front elastic arm for angularly orientating said at least one removable hook with respect to the axis of the inlet or outlet duct to which the seat belongs, the two side edges being configured to interact with respective outer edges of said at least one first front elastic arm and at least one second front elastic arm, each one of which outer edges having a shaped profile ending with a projection, for radially positioning said at least one removable hook with respect to the axis of the inlet or outlet duct to which the seat belongs, wherein the two side edges being configured to interact as stops with respective teeth of said at least one first front elastic arm and at least one second front elastic arm for preventing said at least one removable hook from sliding in an unforced way outside the seat, and wherein said at least one tubular element is selected from the group comprising a connector and a closing stopper.

15. A magnetically actuated valve comprising:

mechanical means for opening and closing the magnetically actuated valve, so as to be configured to occlude and clear, respectively, a mouth of a duct mounted downstream of the magnetically actuated valve, at least one ferromagnetic metal pin movable between a rest position and an operating position, and at least one activation magnet movable between a first position and a second position, said mechanical means being configured to interact with said at least one ferromagnetic metal pin so that when said at least one ferromagnetic metal pin is in said rest position, said mechanical means closes the magnetically actuated valve, and when said at least one ferromagnetic metal pin is in said operating position, said mechanical means opens the magnetically actuated valve, said at least one activation magnet being configured to magnetically interact with said at least one ferromagnetic metal pin so that when said at least one activation magnet is in said first position, said at least one ferromagnetic metal pin is in said rest position, and when said at least one activation magnet is in said second position, said at least one ferromagnetic metal pin is in said operating position, wherein the magnetically actuated valve comprises sliding mechanical means including a slide integrally coupled to said at least one activation magnet and being movable between an initial position and a final position, whereby said at least one activation magnet is slidable between said first and second positions so that when said sliding mechanical means is in said initial and final positions said at least one activation magnet is, respectively, in said first and second positions, said at least one activation magnet being shaped so as to include a slot configured to slide around said at least one ferromagnetic metal pin so that when said sliding mechanical means is in said initial position said at least one ferromagnetic metal pin is in said rest position, wherein said at least one activation magnet does not interact with the same, and when said sliding mechanical means is in said final position said at least one ferromagnetic metal pin is moved to said operating position by an interaction with said at least one activation magnet, wherein said sliding mechanical means further comprises two side pins, integrally coupled to the slide, configured to slide within two respective liners, and a fork structure having two side legs integrally coupled to the two side pins, respectively, the fork structure being integrally coupled to said at least one activation magnet.

16. The magnetically actuated valve according to claim 15, wherein said two side pins are opposed by respective springs.

* * * * *